Figure 1:
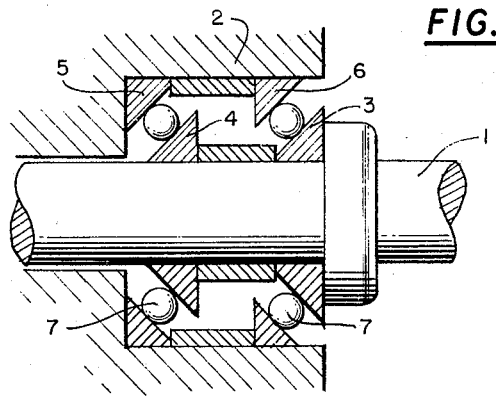

Dec. 16, 1958 P. ESCHMANN 2,864,658
ANTIFRICTION BEARINGS DESIGNED TO ABSORB
HIGH THRUST LOADS
Filed March 16, 1955

INVENTOR

Paul Eschmann

BY

ATTORNEYS

United States Patent Office 2,864,658
Patented Dec. 16, 1958

2,864,658

ANTIFRICTION BEARINGS DESIGNED TO ABSORB HIGH THRUST LOADS

Paul Eschmann, Schweinfurt, Germany, assignor to Kugelfischer Georg Schafer & Co., Schweinfurt, Germany Application March 16, 1955, Serial No. 494,749

Claims priority, application Germany March 22, 1954

7 Claims. (Cl. 308—233)

It has been known that it is difficult safely to impose high thrust loads on antifriction bearings running at high speeds of revolution, since the rolling or antifriction bodies used in such bearings are subject to the action of centrifugal forces. In the case of pure thrust bearings it has, therefore, been necessary to provide for said centrifugal forces to be absorbed by surfaces which give rise to a considerable amount of sliding friction. This, in turn, tends in many cases to increase the development of frictional heat beyond permissible limits. In view of these conditions there has already been proposed the use of angular-contact ball bearings in which the bearing races are shaped in such a manner as to permit the centrifugal forces acting on the balls to be absorbed in such a way that only rolling friction is produced. Since the load-carrying capacity of ball bearings is frequently found to be insufficient where high loads have to be absorbed, it has already been proposed to provide for such high loads to be absorbed by a plurality of bearings which are arranged in series. Due, however, to differences in the thermal expansion and the elasticity of the bearing parts, which factors are known to play a decisive role in highly stressed bearings of the type indicated, it has not been heretofore possible to obtain satisfactory results with such angular-contact ball bearings.

In view of what has been said above, the present invention provides an antifriction bearing which is capable of absorbing high thrust loads, particularly at high rotational speeds, the bearing of the invention being characterized by angular-contact antifriction bearings in nesting arrangement, the said antifriction bearings being axially supported by a resilient member which is substantially of disc shape and is slotted in such a manner as to form a meander-like configuration extending around the circumference of a circle. This arrangement according to the invention renders it possible to subdivide the high axial or thrust load and to distribute it among the individual antifriction bearings. The arrangement may be made such as to provide for an equilibrium of forces throughout the bearing system, this equilibrium of forces being maintained also in cases in which thermal expansion occurs. Furthermore, it is possible with the bearing system of the invention to use the said supporting member to even out the manufacturing tolerances of the anti-friction bearing itself.

In a modified embodiment of the invention the nesting angular-contact antifriction bearings may be conveniently arranged in pairs so that the bearings of each pair are concentric. Moreover, according to the invention, the supporting member serving to distribute the load may be formed either as a narrow zone extending along the central portion of the ring or it may be offset relative to the said central portion.

Figure 2:
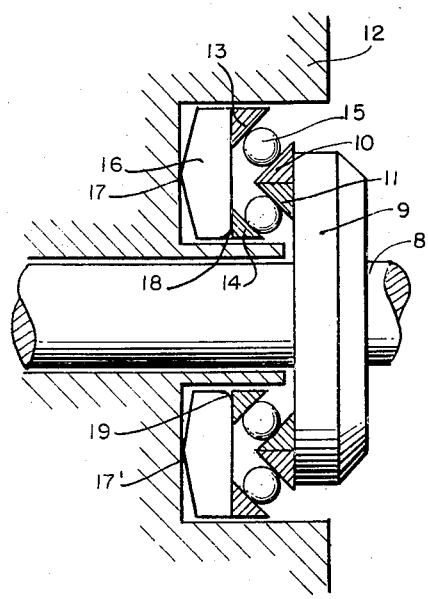
Figure 3:
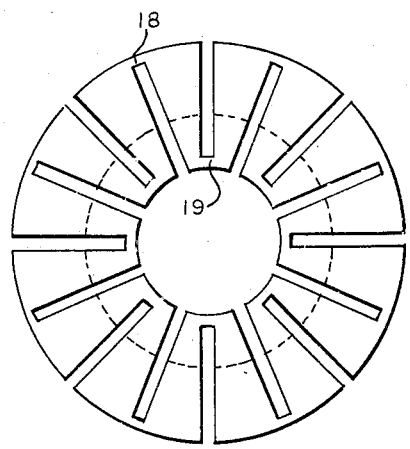

Further objects and features of the invention will become apparent from the following description of a preferred embodiment, reference being had to the appended drawings, in which: Fig. 1 is a longitudinal sectional elevation of a known form of antifriction bearing designed to absorb high thrust loads under conditions of high rotational speed; Fig. 2 is a longitudinal sectional elevation of an embodiment of the invention; Fig. 3 is a plan view of the resilient supporting member which serves to distribute the load which the bearing arrangement has to carry.

In the known construction of Fig. 1 the shaft 1 rotates in relation to the stationary housing 2. Bearing races 3 and 4 are fixedly mounted on the shaft 1, the desired axial distance between said races being maintained by a spacing sleeve. The bearing races 5 and 6 are rigidly secured to the housing 2, their axial distance being maintained by another spacing sleeve. Together with the rolling bodies 7 and 7', the bearing races or rings 3 and 6 and 4 and 5, respectively, constitute angular-contact ball bearings which are arranged in series in an axial direction. With an antifriction bearing arrangement for high thrust loads of this known construction there will occur at high rotational speeds the undesirable conditions described earlier, these conditions being the result of differences in the thermal expansion of the bearing components.

In Fig. 2 there is shown an embodiment of an antifriction bearing according to the invention in which the rotatable shaft 8 has secured to it a disc-shaped thrust member 9 to which are attached the bearing rings 10 and 11 which thus rotate together with said shaft. The bearing rings 13 and 14 are a sliding fit in the stationary housing 12. Arranged between the fixed and rotatable bearing rings are two sets of bearing balls 15. The angular-contact antifriction bearings formed by the parts mentioned and arranged concentrically in nesting relation are axially supported by the resilient supporting member 16 which is in the form of a disc and has radial slots formed therein in such a manner as to produce a meander-like configuration extending along the circumference of a circle, the said supporting member acting as a lever and engaging the housing 12 with the narrow annular zone 17, 17' of that surface which is remote from said ball bearings.

Fig. 3 clearly illustrates the design, including the radial slots producing the meander-like configuration, of the supporting member 16 which serves to distribute the load. Also visible in Fig. 3 are the bridge portions 18 and 19 connecting the individual portions or links of the supporting member.

The narrow annular contact zone 17 extends along the central portion of the back of the load-distributing supporting member 16 and thus uniformly distributes the thrust load among the two separate bearings. If the narrow contact zone of the supporting member is offset outwardly in relation to the central portion of the said member, as is indicated at 17' in Fig. 2, the external one of the two bearings will have to absorb a greater part of the load than the internal one. The invention is of particular importance in respect to high-speed thrust bearings such as are used in jet power plants serving the purpose of aircraft propulsion.

Various changes and modifications may be made without departing from the spirit and scope of the present invention and it is intended that such obvious changes and modifications be embraced by the appended claims.

Having thus particularly described the invention, what is claimed as new and desired to be secured by Letters Patent is:

I claim:

1. An antifriction bearing comprising a stationary housing having an annular recess, a rotatable shaft within said housing disposed in substantially concentric relation to said recess, a disk-shaped thrust member attached to said shaft in facing relation to said recess, a first bearing ring attached to said thrust member, said first bearing ring having a first bearing surface angularly disposed to the axis of said shaft, a second bearing ring slidably disposed adjacent said recess and having a second bearing surface substantially parallel to the said first bearing surface of said first bearing ring, resilient means disposed between and engaging both said second bearing ring and said annular recess in said housing at a position remote from said first bearing ring thereby to resiliently urge said slidable second bearing ring toward said first bearing ring, and a plurality of ball-bearings disposed between and contiguous with the said angularly disposed first and second bearing surfaces of said first and second bearing rings.

2. The combination of claim 1 wherein said resilient means comprises a disk-shaped supporting member having a circular central opening, a first plurality of substantially radial slots in said member extending from the outer periphery of said member toward said opening, and a second plurality of substantially radial slots in said member extending from said central opening toward the outer periphery of said member, the slots of said first and second pluralities being alternately disposed with respect to one another around said supporting member.

3. The combination of claim 2 wherein said first bearing ring includes a further bearing surface disposed at an angle to the axis of said shaft and to said first bearing surface, a third bearing ring slidably disposed adjacent said recess, said third bearing ring also being engaged by said resilient means and having a third bearing surface substantially parallel to said further bearing surface, and a further plurality of ball-bearings disposed between said further bearing surface and said third bearing surface, said further plurality of ball-bearings being disposed in substantially concentric relation to said first-mentioned plurality of ball-bearings.

4. The combination of claim 3 wherein said resilient means engages said second bearing ring adjacent the outer periphery of said disk-shaped supporting member, said resilient means engaging said third bearing ring adjacent the circular central opening of said disk-shaped supporting member, said disk-shaped supporting member including a portion offset from the said outer periphery and the said central opening for engaging a portion of said recess at a positon between the positions of said second and third bearing rings.

5. An antifriction bearing comprising a stationary housing having an elongated bore, an elongated shaft rotatably mounted in said bore, said housing defining an annular recess spaced from said bore and disposed in substantially concentric relation thereto, a first bearing ring slidably disposed in said annular recess adjacent the outer periphery thereof, said first bearing ring including a first bearing surface angularly disposed to the direction of elongation of said shaft, a second bearing ring slidably disposed in said annular recess adjacent the inner periphery thereof, said second bearing ring having a smaller diameter than said first bearing ring and being disposed within said recess in substantially concentric relation to said first bearing ring, said second bearing ring including a second bearing surface angularly disposed to both the direction of elongation of said shaft and to said first bearing surface whereby said first and second bearing surfaces partially face one another in spaced relation within said annular recess, a planar thrust member attached to said shaft in transverse relation thereto, said thrust member being disposed adjacent said annular recess, said thrust member including means defining third and fourth bearing surfaces respectively disposed between said first and second bearing surfaces in facing relation to said first and second bearing surfaces and to said annular recess, said third bearing surface being substantially parallel to said second bearing surface whereby said third and fourth bearing surfaces are angularly disposed on said thrust member in substantially non-facing relation to one another, a first plurality of bearings disposed between said first and third bearing surfaces, a second plurality of bearings disposed between said second and fourth bearing surfaces whereby said first and second pluralities of bearings are disposed in substantially concentric relation to one another in surrounding relation to said shaft, and resilient means within said annular recess including means engaging both said first and second bearing rings and including further means engaging a portion of said annular recess between said first and second bearing rings for resiliently urging said slidable first and second bearing rings toward said third and fourth bearing surfaces on said thrust member.

6. An antifriction bearing for use at high speeds of revolution comprising a stationary housing, a rotatable shaft within said housing, a disk-shaped thrust member attached to said shaft, resilient means, a first bearing ring engaging said resilient means, said resilient means being disposed between said first bearing ring and said housing whereby said resilient means resiliently supports said first bearing ring, said first bearing ring having a first bearing surface angularly disposed to the axis of said shaft, a second bearing ring attached to said thrust member and having a second bearing surface substantially parallel to the said first bearing surface of said first bearing ring, a third bearing ring attached to said thrust member adjacent said second ring and having a third bearing surface disposed at an angle to the axis of said shaft and to said first and second bearing surfaces, and a fourth bearing ring engaging said resilient means and having a fourth bearing surface substantially parallel to the said third bearing surface of said third bearing ring, said first, second, third, and fourth bearing rings being disposed in substantially concentric relation to one another in the specified order whereby said first and fourth spaced bearing rings comprise outer bearing races and said second and third adjacent bearing rings comprise inner bearing races, a plurality of ball-bearings disposed between and contiguous with said first and second bearing surfaces of said first and second bearing rings, and a further plurality of ball-bearings disposed between and contiguous with said third and fourth bearing surfaces of said third and fourth bearing rings, said further plurality of ball-bearings being disposed in substantially concentric relation to said first-mentioned plurality of ball-bearings.

7. The combination of claim 6 wherein said resilient means comprises a disk-shaped supporting member having a circular central opening, a first plurality of substantially radial slots in said member extending from the outer periphery of said member toward said opening, and a second plurality of substantially radial slots in said member extending from said central opening toward the outer periphery of said member, the slots of said first and second pluralities being alternately disposed with respect to one another around said supporting member, said resilient means engaging said first and fourth bearing rings adjacent the outer periphery and central opening of said disk-shaped supporting member respectively, said supporting member having a wedge-shaped surface offset from the outer periphery and central opening thereof whereby said wedge-shaped surface defines an annular region engaging said stationary housing at a position between the positions of said first and fourth bearing rings.

References Cited in the file of this patent
UNITED STATES PATENTS

| | | |
|---|---|---|
| 933,974 | Gohlke | Sept. 14, 1909 |
| 2,630,354 | Burks | Mar. 3, 1953 |

FOREIGN PATENTS

| | | |
|---|---|---|
| 539,472 | France | June 27, 1922 |